(12) United States Patent
Shioda

(10) Patent No.: US 6,500,603 B1
(45) Date of Patent: Dec. 31, 2002

(54) METHOD FOR MANUFACTURING POLYMER OPTICAL WAVEGUIDE

(75) Inventor: Tsuyoshi Shioda, Sodegaura (JP)

(73) Assignee: Mitsui Chemicals, Inc., Tokyo (JP)

(*) Notice: Subject to any disclaimer, the term of this patent is extended or adjusted under 35 U.S.C. 154(b) by 112 days.

(21) Appl. No.: 09/708,520

(22) Filed: Nov. 9, 2000

(30) Foreign Application Priority Data

Nov. 11, 1999 (JP) ............................................ 11-320822
Mar. 23, 2000 (JP) ....................................... 2000-082191

(51) Int. Cl.$^7$ .............................. G02B 6/12; G02B 6/13
(52) U.S. Cl. .................... 430/321; 264/1.24; 264/1.27; 427/508; 427/510; 427/163.2
(58) Field of Search ........................ 430/321; 264/1.24, 264/1.27; 427/508, 510, 163.2

(56) References Cited

U.S. PATENT DOCUMENTS

| | | | |
|---|---|---|---|
| 4,116,753 A | 9/1978 | Tojyo et al. | |
| 5,265,184 A | 11/1993 | Lebby et al. | |

FOREIGN PATENT DOCUMENTS

| | | | |
|---|---|---|---|
| JP | 57-155507 | | 9/1982 |
| JP | 61-138903 | | 6/1986 |
| JP | 2-191906 A | * | 7/1990 |
| JP | 3188402 A | | 8/1991 |
| JP | 49807 A | | 1/1992 |
| JP | 9-189818 A | * | 7/1997 |
| JP | 9-281351 A | | 10/1997 |
| JP | 10-221556 A | | 8/1998 |

OTHER PUBLICATIONS

Patent Abstracts of Japan, vol. 14, No. 477 (P–1118), Oct. 17, 1990.
Patent Abstracts of Japan, vol. 10, No. 334 (P–515), Nov. 13, 1986.

* cited by examiner

Primary Examiner—John A. McPherson
(74) Attorney, Agent, or Firm—Birch, Stewart, Kolasch & Birch, LLP

(57) ABSTRACT

A polymer optical waveguide includes a lower cladding layer of a polymer resin which has a recess and projection transferred from a mold provided with a recess and projection for forming a core portion of the optical waveguide by applying a polymer in molten state or in solution on the mold, and curing the polymer by ultraviolet rays or by heat, and stripping the cured polymer from the mold in a liquid. The cured polymer can be easily stripped from the mold, which allows the mass manufacturing of polymer optical waveguides having various film thicknesses.

10 Claims, 6 Drawing Sheets

METHOD FOR MANUFACTURING POLYMER OPTICAL WAVEGUIDE

BACKGROUND OF THE INVENTION

1. Field of the Invention

The present invention relates to a method for manufacturing a polymer optical waveguide and particularly to a method for manufacturing an optical component such as an optical integrated circuit, optical interconnection, optical coupler or the like.

2. Description of Related Art

Inorganic materials such as quartz glass, multi-component glass or the like, which are characterized by a low optical transmission loss and a wide transmission band, have been widely used as a base material for optical components or optical fibers. Recently, polymer materials have also been developed and are made attractive as materials for optical waveguides because they are superior in workability and cost to the inorganic materials. For example, proposed is a flat plate type optical waveguide having a core-clad structure where a core is formed of a polymer with an excellent transparency, such as polymethyl methacrylate (PMMA) or polystyrene, and a cladding layer is formed of a polymer having a refractive index lower than that of the core material (Japanese Unexamined Patent Publication JP-A 3-188402 (1991)).

On the other hand, a flat plate type optical waveguide with lower loss has been realized by Matsuura et al. using a polyimide which is a transparent polymer of high thermal resistance Japanese Unexamined Patent Publication JP-A 4-9807 (1992)).

These methods, however, need core pattern formation with a photoresist and subsequent recess and projection formation by reactive ion etching or the like for every plate in order to form a core structure on the surface of a cladding layer, and accordingly present problems in mass productivity and price-lowering. Therefore, attempts have been conducted for enhancing the mass-productivity of optical waveguides by performing the injection molding with a mold having a surface processed to have a recess and projection corresponding to a core pattern of the wave guide. In this injection molding, only materials of low glass transition temperature can be used.

SUMMARY

An object of the invention is to provide a method for manufacturing an optical waveguide using a mold for reproducing a core profile to attain costless and simple mass-production of a polymer optical waveguide with low loss and high reliability. In order to achieve such object, it is important that polymer films of various thicknesses are completely stripped from the mold without remaining foreign matters.

The invention provides method for manufacturing a polymer optical waveguide comprising at least a cladding layer of a first polymer, and a core portion of a second polymer formed in a recessed portion provided on a surface of the cladding layer of the first polymer, the method comprising the steps of:

coating the first polymer in molten state or in solution to a molding plate having a projected shape in cross section for forming the core portion, curing the first polymer by ultraviolet rays or by heat, and then stripping the cured first polymer from the molding plate, thereby obtaining the cladding layer having the recessed portion transferred to the surface thereof from the molding plate.

According to the invention, (1) since material of high thermal resistance, use of which is difficult in the injection molding, can be used, a thermal resistance required in soldering for mounting electronic components or the like on an obtained optical waveguide substrate can be achieved. (2) Since the first polymer of lower viscosity can be used for transfer, a high fidelity transfer having a transfer rate of approximately 100% can be achieved. (3)An optical waveguide substrate can be molded in the form of a film. (4) A multi-mode optical waveguide such as one having a core height of 50 $\mu$m and capable of being molded with high aspect ratio can easily be realized.

In addition, while some consideration has been required in conventional injection molding for controlling temperature in the mold to be unified, it is easy in the invention to unify the heating or light irradiation for curing the resin.

The invention also provides a method for manufacturing a polymer optical waveguide comprising at least a cladding layer of a first polymer, and a core portion of a second polymer formed in a recessed portion provided on a surface of the cladding layer of the first polymer, the method comprising the steps of:

coating the second polymer in molten state or in solution to a molding plate having a recessed shape in cross section for forming the core portion, curing the second polymer by ultraviolet rays or by heat, thereto applying the first polymer in molten state or in solution, and after curing, stripping the cured first and second polymers from the molding plate.

According to the invention, (1) since material of high thermal resistance, use of which is difficult in the injection molding, can be used, a thermal resistance squired in soldering for mounting electronic components or the like on an obtained optical waveguide substrate can be achieved. (2) Since the first polymer of lower viscosity can be used for transfer, a high fidelity transfer having a transfer rate of approximately 100% can be achieved. (3) An optical waveguide substrate can be molded in the form of a film. (4) A multi-mode optical waveguide such as one having a core height of 50 $\mu$m and capable of being molded with high aspect ratio can easily be realized.

In addition, while some consideration has been required in conventional injection molding for controlling temperature in the mold to be unified, it is easy in the invention to unify the heating or light irradiation for curing the resin.

In the invention it is preferable that the first or second polymer is coated on the surface of the molding plate after forming a sacrifice layer for facilitating stripping-off of the polymer from the molding plate.

According to the invention, by adjusting the film thickness of the sacrifice layer, the core diameter of the mold can be changed.

While a mold release agent has conventionally been mixed in the polymer resin in order to facilitate the stripping of the polymer resin after molding, according to the invention the mixing of a release agent is not required. Therefore, the polymer resin can be easily stripped without lowering the optical performance of the resin.

In the invention it is preferable that the molding plate and the polymer are exposed to an atmosphere of liquid or vapor when the first polymer or the second polymer is stripped from the molding plate.

While a mold release agent has conventionally been mixed in the polymer resin in order to facilitate the stripping of the polymer resin after molding, according to the invention the mixing of a release agent is rot required. Therefore, the polymer resin can be easily stripped without lowering the optical performance of the resin.

In the invention it is preferable that the sacrifice layer is of a silicon oxide and is removed by etching.

In the invention it is preferable that the molding plate is a silicon wafer and the sacrifice layer is of a silicon oxide obtained by thermally oxidizing the silicon wafer.

In the invention it is preferable that the molding plate is of a polymer resin and the cured polymer is stripped from the molding plate by soaking both in a liquid.

In the invention it is preferable that a second cladding layer of a third polymer is formed on the cladding layer and the core portion.

The methods mentioned above enable easy stripping of a cured polymer from a molding plate and mass-production of polymer optical waveguides of various film thicknesses.

Incidentally, the polymer for forming upper and lower cladding layers and a core preferably has a Tg (glass transition temperature) of 150° C., more preferably of 200° C., as measured by DSC (differential scanning calorimetry) in an atmosphere of nitrogen at a temperature-raising rate of 10° C./min.

BRIEF DESCRIPTION OF THE DRAWINGS

Other and further objects, features, and advantages of the invention will be more explicit from the following detailed description taken with reference to the drawings wherein.

DESCRIPTION OF THE PREFERRED EMBODIMENTS

First Embodiment

A first embodiment of the invention will be described below in detail with reference to the drawings. The substrate having a recess and projection which provides a core portion for the optical waveguide is obtained by applying a process such as plating, plasma etching, chemical etching, laser abrasion or the like to a surface of a substrate formed of a material such as silicon, glass, aluminum, stainless steel or polyimide, or to a surface of a substrate formed of such material and coated with a polymer.

On the substrate is formed a film of metal, glass, polymer or the like as a sacrifice layer for stripping the applied polymer from the substrate by vacuum deposition, spattering, plating, thermal oxidation of the substrate or the like. In this manner, a desired mold is obtained. The process for stripping the mold and removing the sacrifice layer includes chemical etching or the like.

Figure 1:
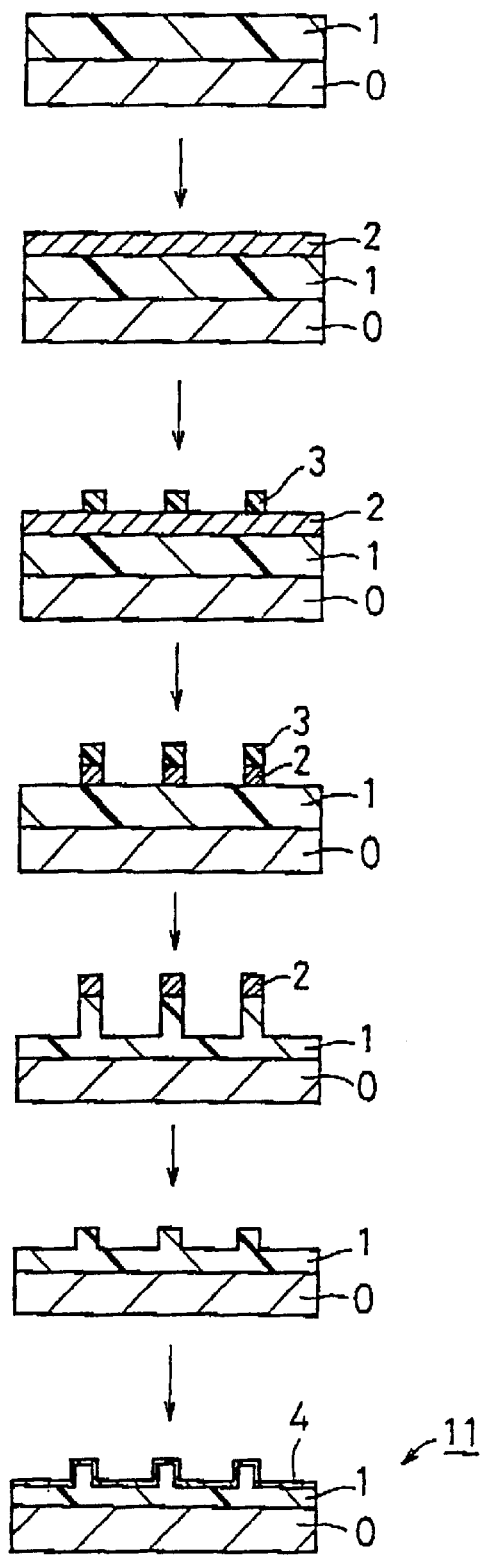
FIG. 1 is a flow chart showing an example of steps for manufacturing a mold in the first embodiment of the invention.

With reference to FIG. 1, a method for manufacturing a mold which is obtained by forming a recess and projection on the surface of a polyimide film of a substrate and overlaying a metal film on the polyimide surface is described below.

A polyamide acid solution, which is a precursor of a polyimide, is applied on a surface of a substrate 0 by spin-coating or the like and heated to imide-formation, thereby forming a polyimide layer 1 on the substrate. As a solvent for the polyamide acid solution is used a polar organic solvent such as N-methyl-2-pyrolidone, N,N-dimethylacetamide, methylsulfoxide or dimethylformamide. Then, a mask layer 2 for forming an optical circuit pattern is formed on the polyimide layer 1. For the mask material can be used a metal such as aluminum and titanium, silicon oxide, spin-on glass (SOG), silicon-containing resist, photosensitive polyimide and the like. After forming the mask layer 2, application of a photoresist, pre-bake, exposure, development and after-bake are carried out to obtained a patterned resist layer 3. Then, a portion of the mask layer which is not protected by the resist layer 3 is removed by a reactive ion etching or using an etching solution or the like, thereby giving a desired waveguide pattern. When a silicon-containing resist or a photosensitive polyimide is used for the mask layer 2, the use of a photoresist is not necessary.

Next, after etching only a portion having exposed polyimide is subjected to reactive ion etching to a predetermined depth, the remaining mask layer 2 is removed by using a reactive ion etching or a release solution. A film of a metal such as aluminum, copper or the like is formed on it as a sacrifice layer 4 by vacuum deposition technique, spattering technique or plating technique. In this manner, the desired mold 11 is obtained.

In the case where a layer of silica glass is used as a sacrifice layer on a substrate on which a recess and projection is formed, the layer of silica glass of 10 nm thick is formed by spattering on the substrate having a recess and projection formed thereon. In this manner, the desired mold is obtained.

In the case where a layer of silicon oxide is formed as a sacrifice layer by thermal oxidation on a silicon wafer on which a recess and projection is formed on the surface, a recess and projection corresponding to a core pattern is formed on the silicon wafer using the plasma etching technique or chemical etching technique fully developed as the semiconductor LSI technique. By subjecting the silicon wafer to thermal oxidation, silicon oxide is formed. In this manner, the desired mold for manufacturing a polymer optical waveguide can be manufactured.

In this case, a mold for manufacturing a polymer optical waveguide can be manufactured repeatedly by subjecting a silicon wafer to thermal oxidation. Since the thickness of the silica glass layer is as small as 10 nm or less, formable width and depth of the groove of the lower cladding layer can be kept within the desired width of ±50 nm even when ten plates are manufactured.

Next, a method for manufacturing an optical waveguide using a mold for a polymer optical waveguide obtained in this manner will be described. While manufacturing of a polyimide optical waveguide using a polyamide acid solution as a precursor of the polyimide is described as an example, it is of course possible to manufacture an optical waveguide using a resin solution of an optical component other than the polyamide acid solution or others as a raw material for the optical waveguide.

Figure 2A:
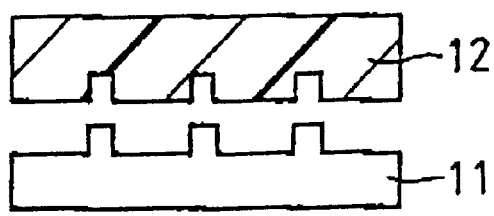
FIGS. 2A and 2B are flow charts showing an example of steps for manufacturing an optical waveguide using a mold in the first embodiment of the inventions
Figure 2A:
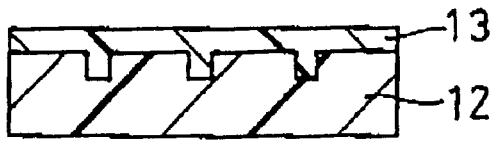
Figure 2A:
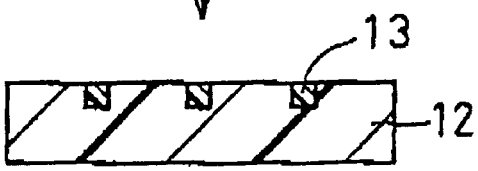
Figure 2A:
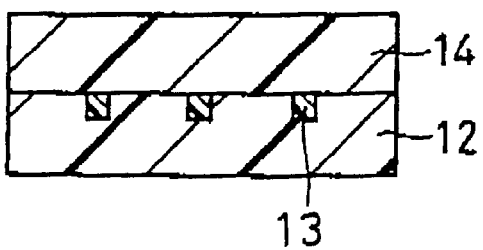
Figure 2B:
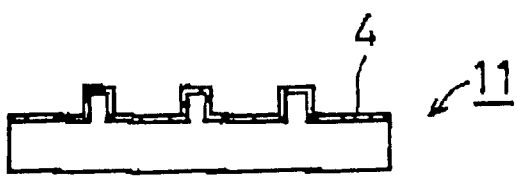

An example of steps of manufacturing an optical waveguide using a mold is shown in flow charts in FIG. 2A and FIG. 2B. In FIG. 2A, a reference numeral 11 denotes a mold, reference numeral 12 a lower cladding layer, reference numeral 13 a core layer, and reference numeral 14 an upper cladding layer, and in FIG. 2B, the reference numeral 11 denotes a mold, and a reference numeral 4 a sacrifice layer. First, the lower cladding layer 12 of polyimide is formed on the mold 11 by applying a first polyamide acid solution, to the obtained mold 11 for a polymer optical waveguide by spin-coating or the like and heating the applied solution for imide-formation. Then, the lower cladding layer is stripped from the maid by etching the sacrifice layer 4 by soaking or the like in a solution which exerts etching effect on the sacrifice layer alone. Then, surface which has been contacted with the mold is turned upward, and by applying a second polyamide acid solution which is a precursor of a polyimide for forming the core layer 13, to the surface of the lower cladding layer by spin-coating or the like and heating the applied solution for imide-formation, a core layer of polyimide is formed on the lower cladding layer. Then, an excess core layer formed on the lower cladding layer is removed by reactive ion etching or the like. Finally, a first polyamide acid solution which is a precursor of a polyimide for forming the upper cladding layer 14 is applied by spin-coating or the like and the applied solution is heated for imide-formation. In this manner, a molded-in polymer optical waveguide can be manufactured using a mold for polymer optical waveguide.

Subsequently, the first embodiment of the invention is described in more detail with reference to several Examples. It can be clearly understood that numberless polymer optical waveguides of the intention can be obtained by using various polymer solutions having different molecular structures. Accordingly, the invention is not limited to these Examples.

Example 1

To a 4 inch-silicon substrate was applied 15 wt % N,N-dimethylacetamide (DMAc) solution of polyamide acids of 2,2-bis(3,4-dicarboxyphenyl)hexafluoropropane dianhydride (6FDA) and 2,2-bis(trifluoromethyl)-4,4'-diaminobiphenyl (6FDB) by the spin-coating method so that a film of 30 $\mu$m thick is formed after heating. A polyimide film was formed by subjecting it to heat treatment at 70° C. for 2 hours, at 160° C. for 1 hour, at 250° C. for 30 minutes and at 350° C. for 1 hour. A silicon-containing resist layer of 1.5 $\mu$m thickness was applied to the polyimide film, and thereafter pre-baked at about 90° C. Then, after subjecting to the contact exposure using a photomask having a 40 line-linear optical waveguide pattern of 6 $\mu$m width of line and 10 cm length at 100 $\mu$m intervals, the photoresist on the exposed part was removed by development using a development solution. Then, post-bake was carried out at 90° C. The polyimide film was etched to a depth of 6 $\mu$m from the film surface by oxygen reactive ion etching using the resist layer with patterning as a mask. Then, the resist layer remaining in the upper layer of polyimide was removed by a release solution. An aluminum film of 50 nm thickness was deposited on the upper layer as a sacrifice layer by vacuum deposition. The recess and projection of the surface was observed by SEM and it was found that the height and width of a ridge were 6 $\mu$m, demonstrating that a mold having a desired form could be manufactured.

Then, 15 wt % DMAc solution of polyamide acids of 6FDA and TFDB was spin-coated on the mold so that a film 0.1 mm thick is formed after heating. Thereafter, the polyimide film was stripped from the mold by soaking the mold and all in 10% aqueous hydrochloric acid solution for etching aluminum, thereby forming a lower cladding layer. The Tg of the polyimide film was 335° C. when measured by DSC in a nitrogen atmosphere at 10° C./min. Then, a surface of the lower cladding layer which had been contacted with the mold was turned upward, and by applying about 15 wt % DMAc solution of polyamide acids of 6FDA and 4,4'-oxydianiline (ODA) for forming the core layer to the surface by spin-coating or the like and heating for imide-formation, a core layer of polyimide was formed on the lower cladding layer. Then, an excess core layer formed on the lower cladding layer was removed by the reactive ion etching. Finally, 15 wt % DMAc solution of polyamide acids of 6FDA and TFDB for forming an upper cladding layer was applied to the lower cladding layer by spin-coating or the like and it was heated for imide-formation, thereby forming the upper cladding layer. In this manner, a molded-in optical waveguide having the lower cladding layer of 0.1 mm thick could be manufactured.

Example 2

To a 4 inch-silicon substrate was applied 15 wt % N,N-dimethylacetamide (DMAc) solution of polyamide acids of 2,2-bis(3,4-dicarboxyphenyl)hexafluoropropane dianhydride (6FDA) and 2,2-bis(trifluoromethyl)-4,4'-diaminobiphenyl (TFDB) by the spin-coating method so that a film of 30 $\mu$m thickness is formed after heating. A polyimide film was formed by subjecting it to heat treatment at 70° C. for 2 hours, at 160° C. for 1 hour, at 250° C. for 30 minutes and at 350° C. for 1 hour. A silicon-containing resist layer of 1.5 $\mu$m thick is applied to the polyimide film, and thereafter pre-baked at about 90° C. Then, after subjecting to the contact exposure using a photomask having a 40 line-linear optical waveguide pattern of 6 $\mu$m width of line and 10 cm length at 100 $\mu$m intervals, the photoresist on the exposed part was removed by development using a development solution. Then, post-bake was carried out at 90° C. The polyimide film was etched to a depth of 6 $\mu$m from the film surface by oxygen reactive ion etching using the resist layer with patterning as a mask. Then, the resist layer remaining in the upper layer of polyimide was removed by a release solution. An aluminum film of 0.1 $\mu$m thickness was deposited on the polyimide layer. The recess and projection of the surface was observed by SEM and it was found that the height and width of a ridge were 6 $\mu$m, respectively, demonstrating that a mold having a desired form could be manufactured.

Then, 15 wt % DMAc solution of polyamide acids of 6FDA and TFDB was coated on the mold by the printing method so that a film of 0.7 mm thickness is formed after heating. Thereafter, the polyimide film was stripped from the mold by soaking the mold and all in 10% aqueous hydrochloric acid solution for etching aluminum, thereby forming a lower cladding layer. Then, a surface which had been contacted with the mold was turned upward, and by applying about 15 wt % DMAc solution of polyamide acids of 6FDA and 4,4'-oxydianiline (ODA) for forming the core layer on the lower cladding layer by spin-coating or the like and heating it for imide-formation, a core layer of polyimide was formed on the lower cladding layer. Then, an excess core layer formed on the lower cladding layer was removed by the reactive ion etching. Finally, 15 wt % DMAc solution of polyamide acids of 6FDA and TFDB for forming an upper cladding layer was applied to the lower cladding layer by spin-coating or the like and it was heated for imide-formation, thereby forming the upper cladding layer. In this manner, a molded-in optical waveguide having a lower cladding layer of 0.7 mm thickness could be manufactured.

Example 3

A mold for a polymer optical waveguide was manufactured by subjecting a 4 inch-wafer having a ridge of 6 μm width and 6 μm height formed by plasma etching to thermal oxidation so that a silicon oxide of 10 nm thickness was formed. Then, 15 wt % DMAc solution of polyamide acids of 6FDA and TFDB was coated on the mold by the printing method so that a film of 0.7 mm thickness is formed after heating. Thereafter, the polyimide film was stripped from the mold by soaking the mold and all in 2% aqueous hydrofluoric acid solution for etching silicon oxide, thereby forming a lower cladding layer. Then, a surface which had been contacted with the mold was turned upward, and by applying about 15 wt % DMAc solution of polyamide acids of 6FDA and 4,4'-oxydianiline (ODA) for forming the core layer on the surface of the lower cladding layer by spin-coating or the like and heating it for imide-formation, a core layer of polyimide was formed on the lower cladding layer. Then, an excess core layer formed on the lower cladding layer was removed by the reactive ion etching. Finally, 15 wt % DMAc solution of polyamide acids of 6FDA and TFDB for forming an upper cladding layer was applied on the lower cladding layer by spin-coating or the like and it was heated for imide-formation, thereby forming the upper cladding layer. In this manner, a molded-in optical waveguide having the lower cladding layer of 0.7 mm thickness could be manufactured.

Example 4

To a 4 inch-silicon substrate was applied 15 wt % N,N-dimethylacetamide (DMAc) solution of polyamide acids of 2,2-bis(3,4-dicarboxyphenyl)hexafluoropropane dianhydride (6FDA) and 2,2-bis(trifluoromethyl)-4,4'-diaminobiphenyl (TFDB) by the spin-coating method so that a film of 30 μm thick is formed after heating. A polyimide film was formed by subjecting it to heat treatment at 70° C. for 2 hours, at 160° C. for 1 hour, at 250° C. for 30 minutes and at 350° C. for 1 hour. A silicon-containing resist layer of 1.5 μm thickness was applied to the polyimide film, and thereafter pre-baked at about 90° C. Then, after subjecting to the contact exposure using a photomask having a 40 line-linear optical waveguide pattern of 6 μm width of line and 10 cm length at 100 μm intervals, the photoresist on the exposed part was removed by development using a development solution. Then, post-bake was carried out at 90° C. The polyimide film was etched to a depth of 6 μm from the film surface by oxygen reactive ion etching using the resist layer with patterning as a mask. Then, the resist layer remaining in the upper layer of polyimide was removed by a release solution. A silica glass of 10 nm thick was deposited on the polyimide upper layer by the sputtering method. The recess and projection of the surface was observed by SEM and it was found that the height and width of a ridge were 6 μm, respectively, demonstrating that a mold having a desired form could be manufactured.

Then, 15 wt % DMAc solution of polyamide acids of 6FDA and TFDB was coated on the mold by the printing method so that a film of 0.1 mm thickness is formed after heating. Thereafter, the polyimide film was stripped from the mold by soaking the mold and all in 2% aqueous hydrofluoric acid solution for etching silica glass, thereby forming a lower cladding layer. Then, a surface which had been contacted with the mold was turned upward, and by applying about 15 wt % DMAc solution of polyamide acids of 6FDA and 4,4'-oxydianiline (ODA) for forming the core layer on the surface of the lower cladding layer by spin-coating or the like and heating it for imide-formation, a core layer of polyimide was formed on the lower cladding layer. Then, an excess core layer formed on the lower cladding layer was removed by the reactive ion etching. Finally, 15 wt % DMAc solution of polyamide acids of 6FDA and TFDB for forming an upper cladding layer was applied on the cladding layer by spin-coating or the like and it was heated for imide-formation, thereby forming the upper cladding layer. In this manner, a molded-in optical waveguide having the lower cladding layer of 0.1 mm thick could be manufactured.

Second Embodiment

The second embodiment of the invention will be described below in detail. The substrate having a recess and projection which provides a core portion for the optical waveguide is obtained by applying a process such as plating, plasma etching, chemical etching, laser abrasion or the like to a surface of a substrate formed of a material such as silicon, glass, aluminum, stainless steel or polyimide, or to a surface of a substrate formed of such material and coated with a polymer.

Figure 3:
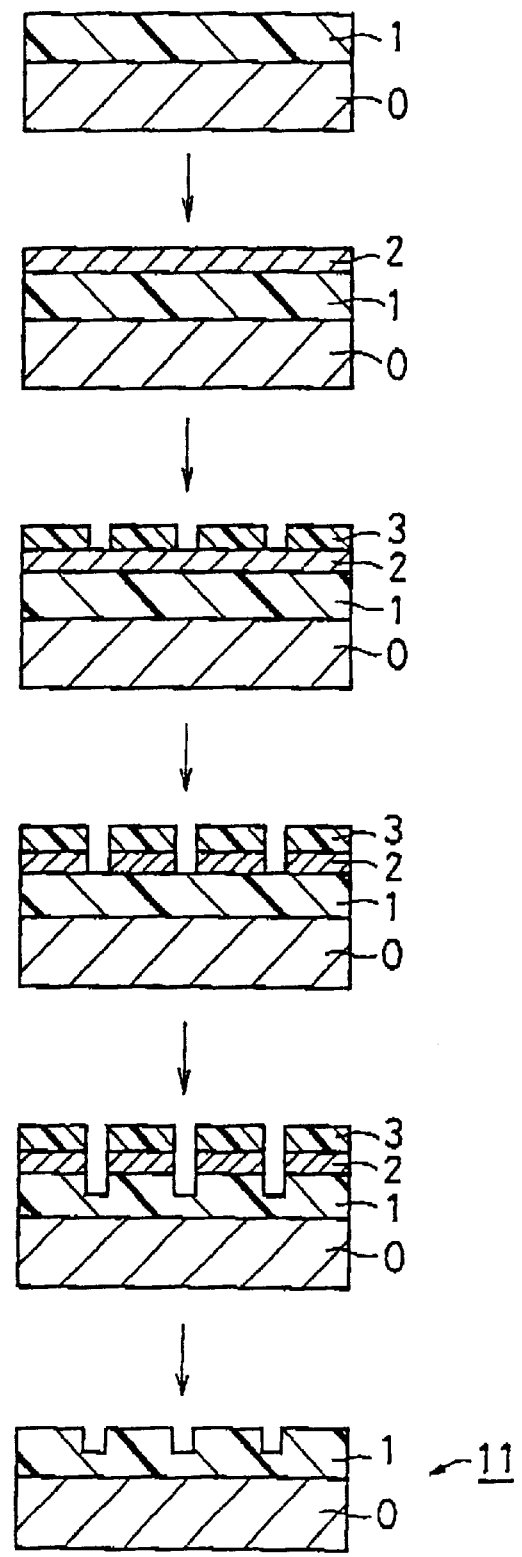
FIG. 3 is a flow chart showing an example of steps for manufacturing a mold in the second embodiment of the invention.

A method for manufacturing a mold, which is prepared by forming a recess and projection on the surface of a polyimide film of a substrate, is described below with reference to FIG. 3.

A polyamide acid solution, which is a precursor of a polyimide, is applied to a surface of a substrate 0 by spin-coating or the like and heated to imide-formation, thereby forming a polyamide layer 1 on the substrate. As a solvent for the polyamide acid solution is used a polar organic solvent such as N-methyl-2-pyrolidone, N,N-dimethylacetamide, methylsulfoxide or dimethylformamide. Then, a mask layer 2 for forming an optical circuit pattern is Formed on the polyimide layer. For the mask can be used a metal such as aluminum, titanium and the like, silicon oxide, spin-on glass (SOG), silicon-containing resist, photosensitive polyimide and the like. After forming the mask layer, application of a photoresist, pre-bake, exposure, development and after-bake are carried out to obtained a patterned resist layer 3. Then, a portion of the mask layer which is not protected by the resist layer is removed by a reactive ion etching or using an etching solution or the like, thereby giving a desired waveguide pattern. When a silicon-containing resist or a photosensitive polyimide is used for the mask layer 2, the use of a photoresist is not necessary.

Next, after etching only a portion having exposed polyimide is subjected to reactive ion etching to a predetermined depth, the remaining mask layer 2 is removed by using a reactive ion etching or a release solution.

Next, a method for manufacturing an optical waveguide using a mold for manufacturing a polymer optical waveguide obtained in this manner will be described. While manufacturing of a polyimide optical waveguide using a polyamide acid solution as a precursor of the polyimide is described as an example, it is of course possible to manufacture an optical waveguide using a resin solution of an optical component other than the polyamide acid solution or others as a raw material for the optical waveguide.

Figure 4:
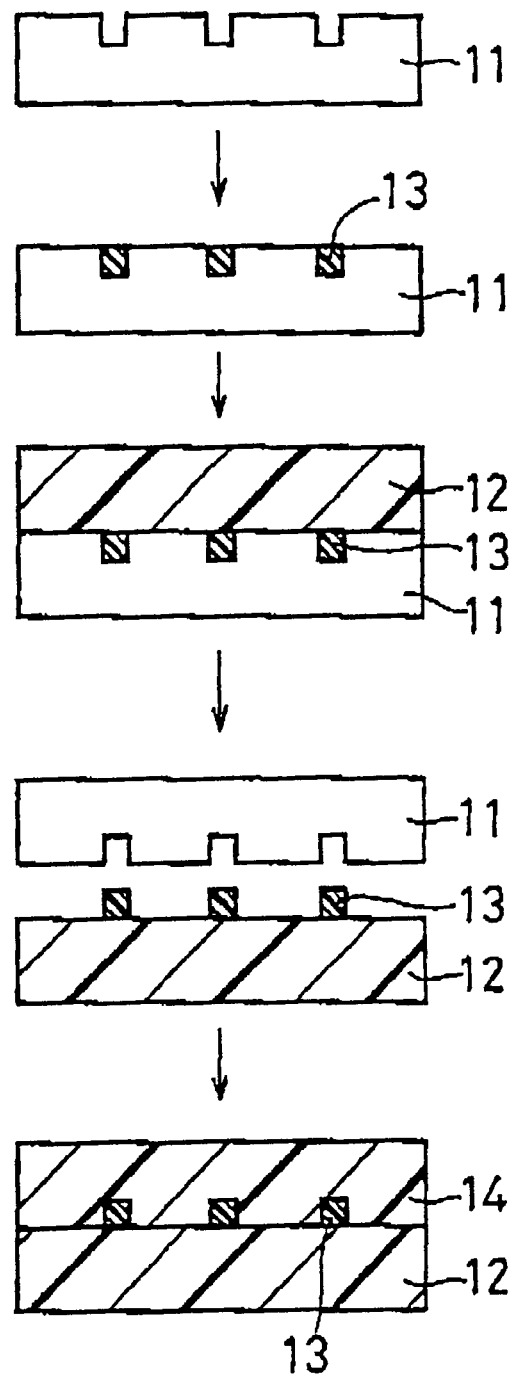
FIG. 4 is a flow chart showing an example of steps for manufacturing an optical waveguide using a mold in the second embodiment of the invention.

An example of steps for a case in which an optical waveguide is manufactured using a mold is shown in the form of a flow chart in FIG. 4. In FIG. 4, the symbol 11 stands for a mold, 22 a lower cladding layer, 13 a core layer, and 14 an upper cladding layer. First, a core layer 13 is embedded in a recessed portion of the mold by applying a first polyamide acid solution to the obtained mold 11 for a polymer optical waveguide by spin-coating or the like and heating it for imide-formation. Then, the lower cladding layer 12 is formed by applying a second polyamide acid solution by spin-coating or the like and heating it for imide-formation. Then, the polymer is stripped from the mold by soaking in a liquid or by placing in a vapor. This allows manufacturing of a ridge type polymer optical waveguide.

In addition, a surface which has been contacted with the mold is turned upward, and a second polyamide acid solution which is a precursor of a polyimide for forming the upper cladding layer 14 is applied to the surface of the lower cladding layer by spin-coating or the like and it is heated for imide-formation, thereby forming the upper cladding layer. In this manner, a molded-in polymer optical waveguide can be manufactured using a mold for polymer optical waveguide.

Subsequently, the second embodiment of the invention is described in more detail with reference to several Examples. It can be clearly understood that numberless polymer optical waveguides of the invention can be obtained by using various polymer solutions having different molecular structures. Accordingly, the invention is not limited to these Examples.

Example 5

A surface of a glass substrate was etched with C-F etching gas to 6 $\mu$m so that 40 recesses of linear optical waveguide pattern of 6 $\mu$m in width of line and 10 cm in length at 100 $\mu$m intervals. The recess and projection of the surface was observed by SEM and it was found that the height and width of grooves were 6 $\mu$m respectively, demonstrating that a mold having a desired form could be manufactured.

Then, 15 wt % N,N-dimethylacetamide (DMAc) solution of polyamide acids of 2,2-bis(3,4-dicarboxyphenyl) hexafluoropropane dianhydride (6FDA) and 4,4'-oxydianiline (ODA) for forming a core layer was applied in the recessed portion of the mold by spin-coating method or the like and embedded by heating for imide-formation. In addition, about 15 wt % DMAc polyamide acid solution of 6FDA and 2,2-bis(trifluoromethyl)-4,4'-diaminobiphenyl (TFDB) for forming a cladding layer was applied by the printing method so that a film of 0.1 mm thickness is formed after heating and it was heated for imide-formation. Thereafter, the polyimide laminate film was stripped from the mold by soaking in an aqueous solution at room temperature for 10 minutes. A surface which had been contacted with the mold was turned upward, and 15 wt % DMAc solution of polyamide acids of 6FDA and TFDB for forming an upper cladding layer was applied by spin-coating or the like and it was heated for imide-formation, thereby forming the upper cladding layer. In this manner, a molded-in optical waveguide could be manufactured.

Example 6

To a 4 inch-silicon substrate was applied 15 wt % DMAc solution of polyamide acids of pyromellitic acid dianhydride (PMDA) and ODA by the spin-coating method so that a film of 30 $\mu$m thickness is formed after heating. A polyimide film was formed by heating for imide-formation. A silicon-containing resist layer of 1.5 $\mu$m thickness was applied to the polyimide film, and thereafter pre-baked at about 90° C. Then, after subjecting to the contact exposure using a photomask having a 40 line-linear optical waveguide pattern with a 6 $\mu$m line width and 10 cm length at 100 $\mu$m intervals, the photoresist on the exposed part was removed by development using a development solution. Then, post-bake was carried out at 90° C. The polyimide film was etched to a depth of 6 $\mu$m from the film surface by oxygen reactive ion etching using the resist layer with patterning as a mask. Then, the resist layer remaining in the upper layer of polyimide was removed by a release solution. The recess and projection of the surface was observed by SEM and it was found that the width and height of a ridge were 6 $\mu$m and 6 $\mu$m, respectively, demonstrating that a mold having a desired form could be manufactured.

Then, 15 wt % DMAc solution of polyamide acids of 6FDA and ODA for forming a core layer was applied in the recessed portion of the mold by spin-coating method or the like and embedded by heating for imide-formation. The polyimide film obtained in this manner had a Tg of 308° C. In addition, about 15 wt % DMAc polyamide acid solution of 6FDA and TFDB for forming a cladding layer was applied by the printing method so that a cladding layer of 0.7 mm thickness is formed after heating and it was heated for imide-formation. Thereafter, the polyimide laminate film was stripped from the mold by soaking in an aqueous solution at room temperature for 10 minutes. A surface which had been contacted with the mold was turned upward, and 15 wt % DMAc solution of polyamide acids of 6FDA and TFDB for forming an upper cladding layer was applied by spin-coating or the like and it was heated for imide-formation. In this manner, a molded-in optical waveguide could be manufactured.

Third Embodiment

The third embodiment of the invention will be described below in detail. The mold having a recess and projection which provides the core portion for the optical waveguide is one which is processed to give a recess and projection which provides the core portion for the optical waveguide on the surface of a substrate made from silicon, glass, aluminum, stainless steel, polyimide or the like or a substrate surface of polymer coated on these substrate by a process such as plating, plasma etching, chemical etching, laser abrasion or the like.

Figure 5:
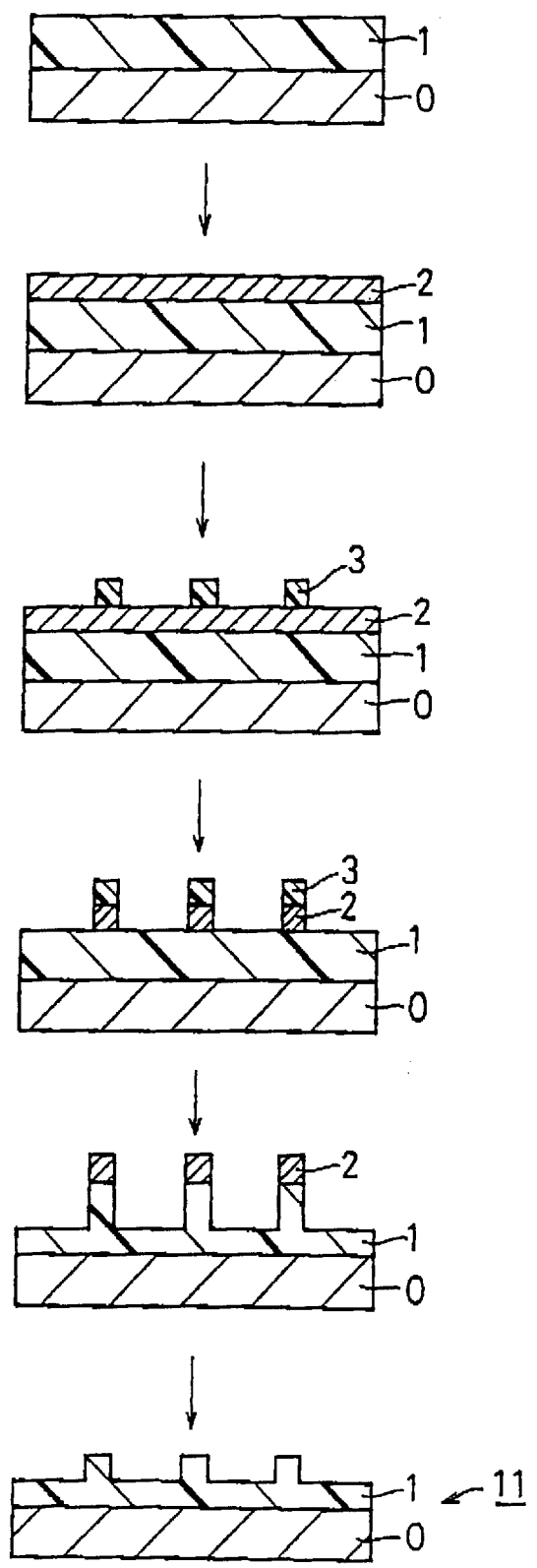
FIG. 5 is a flow chart showing an example of steps for manufacturing a mold in the third embodiment of the invention.

A method for manufacturing a mold, which is prepared by forming a recess and projection on the surface of a polyimide film of a substrate, is described below with reference to FIG. 5, A polyamide acid solution, which is a precursor of a polyimide, is applied to a surface of a substrate 0 by spin-coating or the like and heated to imide-formation, thereby forming a polyimide layer 1 on the substrate. As a solvent for the polyamide acid solution is used a polar organic solvent such as N-methyl-2-pyrolidone, N,N-dimethylacetamide, methylsulfoxide or dimethylformamide. Then, a mask layer 2 for forming an optical circuit pattern is formed on the polyimide layer 1. For the mask material can be used a metal such as aluminum and titanium, silicon oxide, spin-on glass (SOG), silicon-containing resist, photosensitive polyimide and the like. After forming the mask layer 2, application of a photoresist, pre-bake, exposure development and after-bake are carried out to obtained a patterned resist layer 3. Then, a portion of the mask layer which is not protected by the resist layer 3 is removed by a reactive ion etching or using an etching solution or the like, thereby giving a desired waveguide pattern. When a silicon-containing resist or a photosensitive polyimide is used for the mask Layer 2, the use of a photoresist is not necessary.

Next, after etching only a portion having exposed polyimide is subjected to reactive ion etching to a predetermined depth, the remaining mask layer 2 is removed by using a reactive ion etching or a release solution.

Next, a method for manufacturing an optical waveguide using a mold for manufacturing a polymer optical waveguide obtained in this manner will be described. While manufacturing of a polyimide optical waveguide using a polyamide acid solution as a precursor of the polyimide is described as an example, it is of course possible to manufacture an optical waveguide using a resin solution of an optical component other than the polyamide acid solution or others as a raw material for the optical waveguide.

Figure 6:
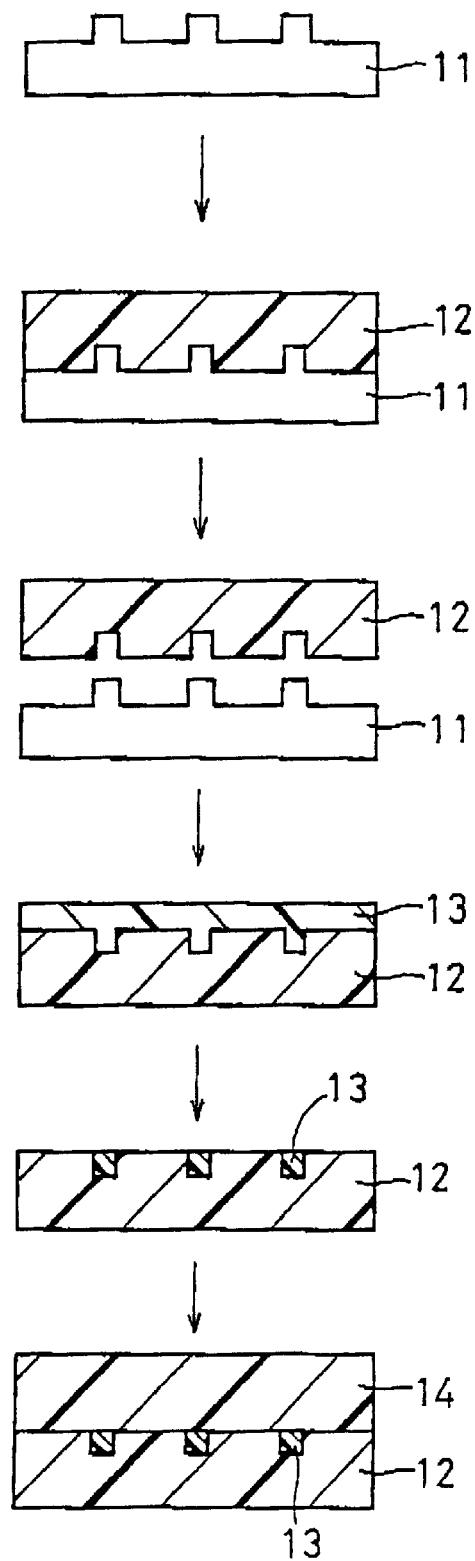
FIG. 6 is a flow chart showing an example of steps for manufacturing an optical waveguide using a mold in the third embodiment of the invention.

An example of steps for a case in which an optical waveguide is manufactured using a mold is shown in the form of a flow chart in FIG. 6. In FIG. 6, the symbol 11 stands for a mold, 12 a lower cladding layer, 23 a core layer, and 14 an upper cladding layer, first, a lower cladding layer 12 is formed on the mold by applying a first polyamide acid solution to the obtained mold 11 for polymer optical waveguides by spin-coating or the like and heating it for imide-formation.

Then, the lower cladding layer is stripped from the mold by possibly soaking in a liquid for 10 minutes. Then, a core layer of a polyimide is formed on the lower cladding layer by turning upward a surface which has been contacted with the mold, applying a second polyamide acid solution which is a precursor of a polyimide for forming the core layer 13 to the surface of the lower cladding layer by spin-coating or the like and heating it for imide-formation. Then, an excess core Layer formed on the lower cladding layer is removed by the reactive ion etching or the like. Finally, a first polyamide acid solution which is a precursor of a polyimide for forming the upper cladding layer 14 is applied by spin-coating or the like and it is heated for imide-formation. In this manner, a molded-in polymer optical waveguide can be manufactured using a mold for polymer optical waveguides.

Subsequently, the third embodiment of the invention is described in more detail with reference to several Examples. It can be clearly understood that numberless polymer optical waveguides of the invention can be obtained by using various polymer solutions having different molecular structures. Accordingly, the invention is not limited to these Examples.

Example 7

A surface of a glass substrate was etched with C-F etching gas to 6 $\mu$m so that 40 projections of linear optical waveguide pattern of 6 $\mu$m width of line and 10 cm length at 100 $\mu$m intervals. The recess and projection of the surface was observed by SEM and it was found that the height and width of grooves were 6 $\mu$m, demonstrating that a mold having a desired form could be manufactured.

Then, 15 wt % DMAc solution of polyamide acids of 2,2-bis(3,4-dicarboxyphenyl)hexafluoropropane dianhydride (6FDA) and 2,2-bis(trifluoromethyl)-4,4'-diaminobiphenyl (TFDB) was spin coated on the mold so that a film of 0.1 mm thickness is formed after heating. After heating for imide-formation, the polyimide film was stripped from the mold by soaking it in an aqueous solution. Then, a core layer of polyimide was formed on the lower cladding layer by turning upward a surface which had been contacted with the mold, applying about 15 wt % DMAc solution of polyamide acids of 6FDA and 4,4'-oxydianiline (ODA) for forming a core layer by spin-coating or the like and heating it for imide-formation. Then, an excess core layer formed on the lower cladding layer was removed by the reactive ion etching. Finally, 15 wt % DMAc solution of a polyamide acid of 6FDA and TFDB for forming the upper cladding layer was applied by spin-coating or the like and it is heated for imide-formation. In this manner, a molded-in optical waveguide having a lower cladding layer of 0.1 mm thickness could be manufactured.

Example 8

To a 4 inch-silicon substrate was applied 15 wt % N,N-dimethylacetamide (DMAc) solution of polyamide acids of pyromellitic acid dianhydride (PMDA) and 4,4'-oxydianiline (ODA) by the spin-coating method so that a film of 30 $\mu$m thickness is formed after heating. A polyimide film was formed by heating for imide-formation. A silicon-containing resist layer of 1.5 $\mu$m thickness was applied to the polyimide film, and thereafter pre-baked at about 90° C. Then, after subjecting to the contact exposure using a photomask having a 40 line-linear optical waveguide pattern of 6 $\mu$m width of line and 10 cm length at 100 $\mu$m intervals, the photoresist on the exposed part was removed by development using a development solution. Then, post-bake was carried out at 90° C. The polyimide film was etched to a depth of 6 $\mu$m from the film surface by oxygen reactive ion etching using the resist layer with patterning as a mask. Then, the resist layer remaining in the upper layer of polyimide was removed by a release solution. The recess and projection of the surface was observed by SEM and it was found that the height and width of a ridge were 6 $\mu$m respectively, demonstrating that a mold having a desired form could be manufactured.

Then, 15 wt% DMAc solution of polyamide acids of 6FDA and TFDB was coated on the mold by the printing method so that a film of 0.7 mm thickness is formed after heating. Thereafter, the polyimide film was stripped from the mold by dipping in an aqueous solution. Then, a core layer of polyimide was formed on the lower cladding layer by turning upward a surface which had been contacted with the mold, applying about 15 wt % DMAc solution of polyamide acids of 6FDA and ODA for forming a core layer by spin-coating or the like and heating it for imide-formation. Then, an excess core layer formed on the lower cladding layer was removed by the reactive ion etching. Finally, 15 wt % DMAc solution of a polyamide acid of 6FDA and TFDB for forming the upper cladding layer was applied by spin-coating or the like and it is heated for imide-formation. In this manner, a molded-in optical waveguide having a lower cladding layer of 0.7 mm thickness could be manufactured.

In the above-mentioned example, it is also possible to strip the polymer from the mold by exposing to an atmosphere of vapor (e.g. water vapor of 85% RH at 80° C.) instead of dipping in an aqueous solution.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A method for manufacturing a polymer optical waveguide comprising at least a cladding layer of a first polymer, and a core portion of a second polymer formed in a recessed portion provided on a surface of the cladding layer of the first polymer, the method comprising the steps of:

coating the first polymer in molten state or in solution to a molding plate having a projected shape in cross section for forming the core portion;

curing the first polymer by ultraviolet rays or by heat; and stripping the cured first polymer from the molding plate, thereby obtaining the cladding layer having the recessed portion transferred to the surface thereof from the molding plate, wherein the molding plate and the polymer are exposed to an atmosphere of liquid or vapor when the first polymer or the second polymer is stripped from the molding plate.

2. The method for manufacturing a polymer optical waveguide of claim 1, wherein the molding plate is of a polymer resin and the cured polymer is stripped from the molding plate by soaking both in a liquid.

3. A method for manufacturing a polymer optical waveguide comprising at least a cladding layer of a first polymer, and a core portion of a second polymer formed in a recessed portion provided on a surface of the cladding layer of the first polymer, the method comprising the steps of:

coating the second polymer in molten state or in solution to a molding plate having a recessed shape in cross section for forming the core portion;

curing the second polymer by ultraviolet rays or by heat, thereto applying the first polymer in molten state or in solution; and stripping the cured first and second polymers from the molding plate, wherein the molding plate and the polymer are exposed to an atmosphere of liquid or vapor when the first polymer or the second polymer is stripped from the molding plate.

4. The method for manufacturing a polymer optical waveguide of claim 3, wherein the molding plate is of a polymer resin and the cured polymer is stripped from the molding plate by soaking both in a liquid.

5. A method for manufacturing a polymer optical waveguide comprising at least a cladding layer of a first polymer, and a core portion of a second polymer formed in a recessed portion provided on a surface of the cladding layer of the first polymer, the method comprising the steps of:

coating the first polymer in molten state or in solution to a molding plate having a projected shape in cross section for forming the core portion;

curing the first polymer by ultraviolet rays or by heat; and stripping the cured first polymer from the molding plate, thereby obtaining the cladding layer having the recessed portion transferred to the surface thereof from the molding plate, wherein the first or second polymer is coated on a surface of the molding plate after forming a sacrifice layer for facilitating stripping-off of the polymer from the molding plate, and the sacrifice layer is of a silicon oxide and is removed by etching.

6. A method for manufacturing a polymer optical waveguide comprising at least a cladding layer of a first polymer, and a core portion of a second polymer formed in a recessed portion provided on a surface of the cladding layer of the first polymer, the method comprising the steps of:

coating the second polymer in molten state or in solution to a molding plate having a recessed shape in cross section for forming the core portion;

curing the second polymer by ultraviolet rays or by heat, thereto applying the first polymer in molten state or in solution; and stripping the cured first and second polymers from the molding plate, wherein the first or second polymer is coated on a surface of the molding plate after forming a sacrifice layer for facilitating stripping-off of the polymer from the molding plate, and the sacrifice layer is of a silicon oxide and is removed by etching.

7. A method for manufacturing a polymer optical waveguide comprising at least a cladding layer of a first polymer, and a core portion of a second polymer formed in a recessed portion provided on a surface of the cladding layer of the first polymer, the method comprising the steps of:

coating the first polymer in molten state or in solution to a molding plate having a projected shape in cross section for forming the core portion;

curing the first polymer by ultraviolet rays or by heat; and stripping the cured first polymer from the molding plate, thereby obtaining the cladding layer having the recessed portion transferred to the surface thereof from the molding plate, wherein the first or second polymer is coated on a surface of the molding plate after forming a sacrifice layer for facilitating stripping-off of the polymer from the molding plate, and the molding plate is a silicon wafer and the sacrifice layer is of a silicon oxide obtained by thermally oxidizing the silicon wafer.

8. A method for manufacturing a polymer optical waveguide comprising at least a cladding layer of a first polymer, and a core portion of a second polymer formed in a recessed portion provided on a surface of the cladding layer of the first polymer, the method comprising the steps of:

coating the second polymer in molten state or in solution to a molding plate having a recessed shape in cross section for forming the core portion;

curing the second polymer by ultraviolet rays or by heat, thereto applying the first polymer in molten state or in solution; and stripping the cured first and second polymers from the molding plate, wherein the first or second polymer is coated on a surface of the molding plate after forming a sacrifice layer for facilitating stripping-off of the polymer from the molding plate, and the molding plate is a silicon wafer and the sacrifice layer is of a silicon oxide obtained by thermally oxidizing the silicon wafer.

9. A method for manufacturing a polymer optical waveguide comprising at least a cladding layer of a first polymer, and a core portion of a second polymer formed in a recessed portion provided on a surface of the cladding layer of the first polymer, the method comprising the steps of:

coating the first polymer in molten state or in solution to a molding plate having a projected shape in cross section for forming the core portion;

curing the first polymer by ultraviolet rays or by heat; and stripping the cured first polymer from the molding plate, thereby obtaining the cladding layer having the recessed portion transferred to the surface thereof from the molding plate, wherein the first or second polymer is coated on a surface of the molding plate after forming a silicon oxide sacrifice layer for facilitating stripping-off of the polymer from the molding plate, and the molding plate and the polymer are exposed to an atmosphere of liquid or vapor when the first polymer or the second polymer is stripped from the molding plate.

10. A method for manufacturing a polymer optical waveguide comprising at least a cladding layer of a first polymer, and a core portion of a second polymer formed in a recessed portion provided on a surface of the cladding layer of the first polymer, the method comprising the steps of:

coating the second polymer in molten state or in solution to a molding plate having a recessed shape in crass section for forming the core portion;

curing the second polymer by ultraviolet rays or by heat, thereto applying the first polymer in molten state or in solution; and stripping the cured first and second polymers from the molding plate, wherein the first or second polymer is coated on a surface of the molding plate after forming a silicon oxide sacrifice layer for facilitating stripping-off of the polymer from the molding plate, and the molding plate and the polymer are exposed to an atmosphere of liquid or vapor when the first polymer or the second polymer is stripped from the molding plate.

* * * * *